(12) United States Patent
Nutaro

(10) Patent No.: US 9,696,546 B2
(45) Date of Patent: Jul. 4, 2017

(54) HEAD-MOUNTABLE COCKPIT DISPLAY SYSTEM

(75) Inventor: Joseph Nutaro, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2066 days.

(21) Appl. No.: 12/165,387

(22) Filed: Jun. 30, 2008

(65) Prior Publication Data

US 2010/0001928 A1 Jan. 7, 2010

(51) Int. Cl.
*G02B 27/01* (2006.01)

(52) U.S. Cl.
CPC ....... *G02B 27/017* (2013.01); *G02B 27/0172* (2013.01); *G02B 2027/014* (2013.01); *G02B 2027/0118* (2013.01); *G02B 2027/0123* (2013.01)

(58) Field of Classification Search
USPC ................ 359/13–14, 629–630; 345/7–8
See application file for complete search history.

(56) References Cited

U.S. PATENT DOCUMENTS

| | | | |
|---|---|---|---|
| 4,869,575 A | | 9/1989 | Kubik |
| 4,897,715 A * | | 1/1990 | Beamon, III ................. 348/115 |
| 5,162,828 A | | 11/1992 | Furness et al. |
| 5,281,957 A * | | 1/1994 | Schoolman ....................... 345/8 |
| 5,572,229 A * | | 11/1996 | Fisher ............................. 345/8 |
| 5,621,424 A * | | 4/1997 | Shimada et al. .................. 345/8 |
| 5,971,538 A | | 10/1999 | Heffner |
| 6,023,372 A | | 2/2000 | Spitzer et al. |
| 6,061,064 A | | 5/2000 | Reichlen |
| 6,181,644 B1 * | | 1/2001 | Gallagher ...................... 367/131 |
| 6,359,602 B1 | | 3/2002 | Amafuji et al. |
| 6,417,969 B1 | | 7/2002 | DeLuca et al. |
| 6,676,259 B1 | | 1/2004 | Trifilo |
| 6,730,934 B2 | | 5/2004 | Yamada et al. |
| 6,826,532 B1 | | 11/2004 | Casby et al. |
| 6,945,648 B2 | | 9/2005 | Schindler et al. |
| 6,947,014 B2 | | 9/2005 | Wooten |
| 7,088,234 B2 | | 8/2006 | Naito et al. |
| 7,116,879 B2 | | 10/2006 | Arakida |
| 7,145,726 B2 | | 12/2006 | Geist |
| 7,319,437 B2 * | | 1/2008 | Yamamoto ......................... 345/8 |
| 2002/0158816 A1 | | 10/2002 | Snider |
| 2004/0178970 A1 * | | 9/2004 | El Sayed et al. ................. 345/8 |
| 2004/0252077 A1 * | | 12/2004 | Terasaki ........................... 345/8 |
| 2006/0284791 A1 * | | 12/2006 | Chen et al. ....................... 345/8 |

\* cited by examiner

*Primary Examiner* — Kenneth Bukowski
(74) *Attorney, Agent, or Firm* — Lorenz & Kopf, LLP

(57) ABSTRACT

Systems and apparatus are provided for head-mountable cockpit displays for providing information related to an aircraft system to a user. A cockpit display system comprises an eyeglass frame adapted for wearing on the head of the user. The eyeglass frame has a perimeter defining a field of view. A display element is mechanically coupled to the eyeglass frame and aligned with a bottom portion of the field of view. Display electronics are coupled to the display element, and an avionics system is coupled to the display electronics. The display electronics are configured to render an image of a cockpit instrument panel associated with the avionics system on the display element.

2 Claims, 3 Drawing Sheets

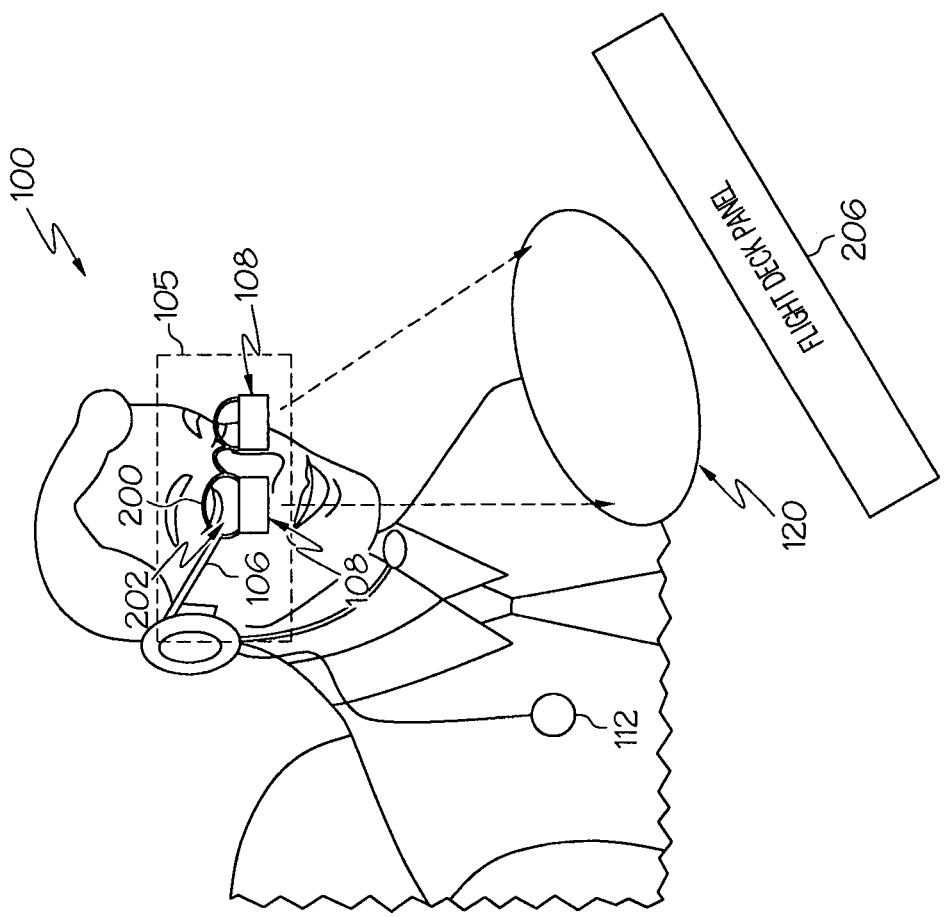

HEAD-MOUNTABLE COCKPIT DISPLAY SYSTEM

TECHNICAL FIELD

The subject matter described herein relates generally to electronic display systems, and more particularly, embodiments of the subject matter relate to methods and systems for head-mountable display systems for simulating a cockpit instrument panel in an aircraft.

BACKGROUND

Electronic cockpit displays (e.g., glass cockpits) have replaced traditional mechanical gauges and utilize computerized or electronic displays to graphically convey information related to various electronic systems associated with the electronic display. Typically, there may be as many as six or more electronic displays in most large aircraft (e.g., commercial or military aircraft), and as many as three or more electronic displays in smaller aircraft (e.g., private aircraft). These display systems are generally expensive to build and install. While these costs may be acceptable for high-end commercial or military deployments, in the case of smaller aircraft, the added cost is often unacceptable and/or impractical. For example, smaller aircraft typically have smaller space available within the cockpit, and therefore result in additional size and/or positioning constraints when trying to accommodate a smaller flight deck. Once the electronic display systems are installed, they are difficult to modify or adjust (e.g., size, shape, positioning). Furthermore, the added costs and difficulties become even greater when retrofitting an aircraft.

Some electronic display systems do not require additional space within a cockpit flight deck. For example, head-up displays are often used to project critical flight data within a pilot's field of vision. These head-up displays are transparent displays that project and/or overlay data (or images) over a real-world environment without obstructing the user's view. In order allow the user to view a projected image (or data), many head-up displays require the user to look through a display element (e.g., a combiner) attached to the airframe or another object in the cockpit. Various head-mounted (or helmet-mounted) head-up display systems have developed that project an image and/or data onto a visor (or lens, or some other transparent panel).

Thus, in most head-up display systems, in addition to requiring some sort of projector device, the displayed image is required to be substantially transparent or otherwise limited in size to allow for overlay. As a result, head-up displays are often complex and costly. Additionally, the size and/or robustness of the projected image is often governed by the size limitations of the display element (e.g., combiner, bezel, visor, lens). Therefore, many of these displays are generally constrained to a limited symbology and limited flight information (e.g., airspeed, altitude), and still require panel mounted displays in the cockpit or flight deck to provide additional flight information (e.g., maps, engine parameters, aircraft monitoring). Thus, while available head-mounted displays may be suitable for replacing displays related to basic flight information, they are inadequate for the purposes of replacing and/or simulating a glass cockpit and many of the traditional panel mounted electronic display systems.

BRIEF SUMMARY

A system is provided for providing information related to an aircraft system to a user. A cockpit display system comprises an eyeglass frame adapted for wearing on the head of the user. The eyeglass frame has a perimeter defining a field of view. A display element is mechanically coupled to the eyeglass frame and aligned with a bottom portion of the field of view. Display electronics are coupled to the display element, and an avionics system is coupled to the display electronics. The display electronics are configured to render an image of a cockpit instrument panel associated with the avionics system on the display element.

An apparatus is provided for a head-mountable device suitable for wearing during operation of an aircraft. The head-mountable device comprises an eyeglass frame adapted to be worn on the head of a user. The eyeglass frame defines a field of view aligned with the eyes of the user, wherein the field of view is substantially transparent. A display element is supported by the eyeglass frame and obstructs a lower portion of the field of view. A display controller is coupled to the display element, and the display controller is configured to control rendering of an image on the display element, wherein the image contains information associated with operation of the aircraft, and present the image rendered on the display element as a wide-angle image.

BRIEF DESCRIPTION OF THE DRAWINGS

Embodiments of the subject matter will hereinafter be described in conjunction with the following drawing figures, wherein like numerals denote like elements.

FIG. 3 a schematic view of an exemplary operating environment suitable for use with the cockpit display system of FIG. 1.

DETAILED DESCRIPTION

Figure 1:
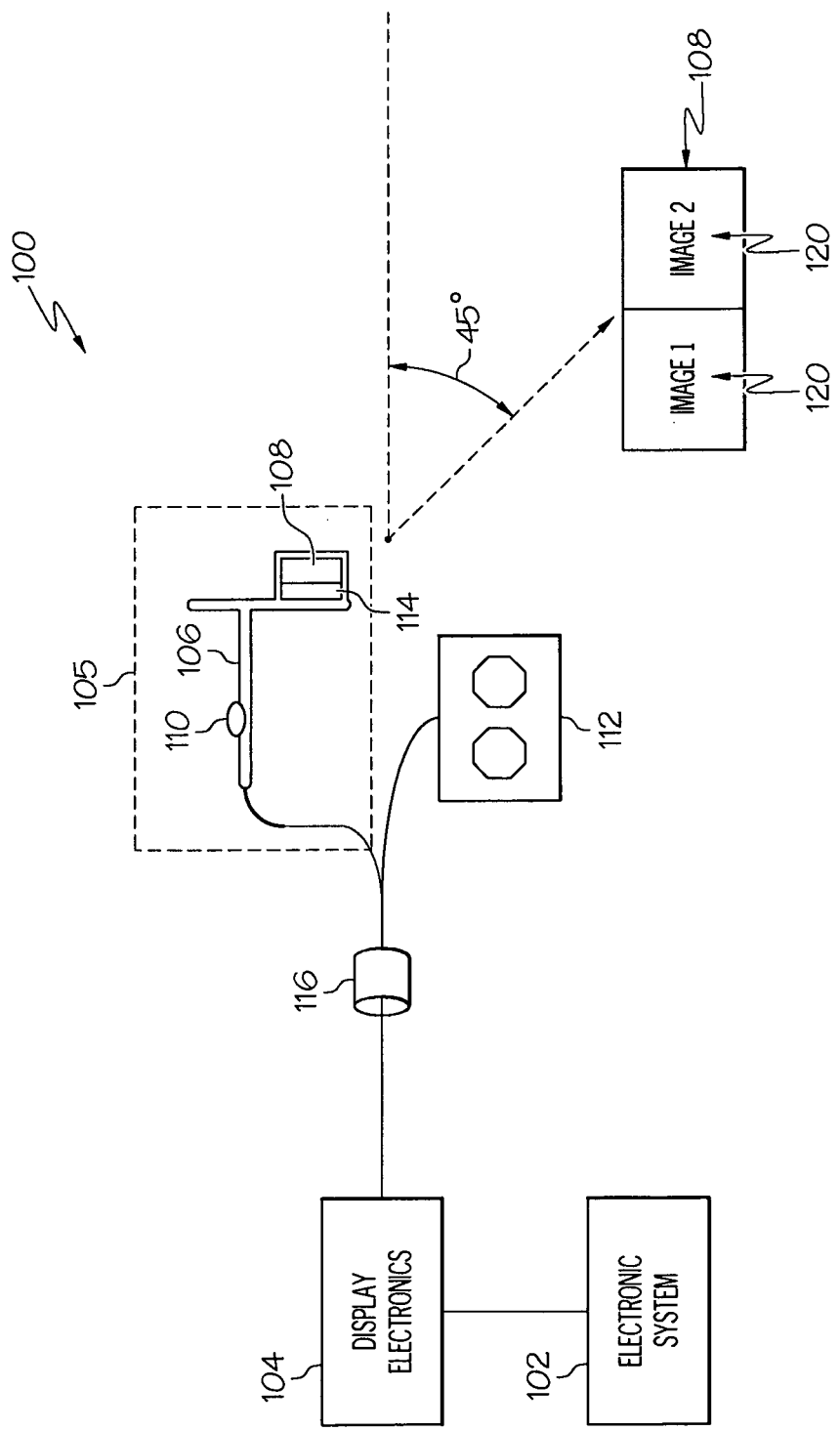
FIG. 1 is a block diagram of a cockpit display system in accordance with one embodiment.

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter.

For the sake of brevity, conventional techniques related to graphics and image processing, data transmission, avionics instrumentation, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to head-mountable cockpit display systems for use in aircraft. Although the embodiments shown and described herein may be in the context of an aviation environment, it should be understood that the subject matter is not limited in scope for use in aircraft, and alternatively may apply in other environments, such as automotive environments or marine environments. Generally, the head-mountable cockpit display system described herein simulates the view of an aircraft glass cockpit (e.g., an aircraft flight deck panel with multiple large electronic displays) while reducing space and/or size requirements.

Referring now to FIG. 1, in an exemplary embodiment, a cockpit display system 100 may include, without limitation, an electronic system 102, display electronics 104, and a head-mountable device 105. The head-mountable device 105 may further include, without limitation, at least a support structure 106 and a display element 108. In various embodiments, the cockpit display system 100 and/or head-mountable device 105 may also include one or more sensor systems 110, control elements 112, optics 114, and one or more connectors 116, to support or provide additional functionality or features to the cockpit display system 100 as described below. These, and other elements, may be coupled and suitably configured to render an image 120 of an instrument panel associated with the electronic system 102 on the display element 108, as described in greater detail below. It should be understood that FIG. 1 is a simplified schematic representation of a cockpit display system 100, and is only one example of a suitable operating environment and is not intended to suggest any limitation as to the scope of use or functionality of any practical embodiment. Other well known electronic systems, environments, and/or configurations that may be suitable for use include, but are not limited to, automotive and/or dashboard display systems, marine display systems, video game and/or computer simulation systems, and the like.

In an exemplary embodiment, the electronic system 102 is coupled to the display electronics 104, which in turn is coupled to the head-mountable device 105. In an exemplary embodiment, the head-mountable device 105 is configured such that the display element 108 is coupled to the display electronics 104. The display element is mechanically coupled to the support structure 106. In an exemplary embodiment, optics 114 are integral with the display element 108 and may also be coupled to the display electronics 104, as described below. Depending on the embodiment, sensor system 110 and control element 112 may respectively be coupled to the display electronics 104, the display element 108, or both. A connector 116 may be coupled between the display electronics 104 and other elements, to allow selective coupling to the display electronics 104, and coupling more than one element to the display electronics 104, as described in greater detail below. It should be noted that in other embodiments, one or more suitable wireless communication protocols (e.g., using IEEE 802.11, Bluetooth, infrared) may be substituted for connector 116 and any physical connections to support interdevice communications with the display electronics 104, as will be appreciated in the art.

In an exemplary embodiment, the electronic system 102 may be realized as an avionics system or aircraft subsystem, such as a communications system, navigation system, flight control system, aircraft monitoring or management system, weather monitoring system, radar system, collision avoidance systems, or the like. In practical embodiments, an aircraft may include one or more avionics systems, and various combinations thereof, as will be understood. Accordingly, cockpit display system 100 may be adapted to support one or more electronic systems 102.

In an exemplary embodiment, the electronics system 102 has at least one physical or virtual instrument panel associated therewith, wherein the instrument panel provides graphical information indicative and/or representative of one or more characteristics of the electronic system 102 during operation. For example, an avionics system may typically have in traditional glass cockpits one or more instrument panels (or electronic displays) associated with the avionics system, which reside within the cockpit and/or in the flight deck panel, and convey and/or display information associated with operation of the aircraft. Such information may include, without limitation, airspeed, altitude, attitude, engine status, compass direction, and other navigation and equipment status information. The electronic system 102 may also have one or more associated mechanical controls and/or human machine interfaces, which may be used to interact with, adjust, or otherwise influence the operation of the electronic system 102, as will be understood. For example, an avionics system may include knobs, buttons, switches, sliders, levers, or the like located within the cockpit or integrated in the flight deck panel.

In an exemplary embodiment, the display electronics 104 is coupled to the electronic system 102 and the display element 108, and suitably configured to control rendering of the image 120 on the display element 108. The display electronics 104 generally represents any practical combination of hardware, software, firmware, processing logic, and/or other components which may be suitably configured to perform the tasks and functions described herein. In an exemplary embodiment, the display electronics 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. The display electronics 104 may also include sufficient data storage capacity or memory to support the operation of cockpit display system 100, as will be understood. In practice, display electronics 104 includes processing logic that may be configured to control rendering of an image 120 associated with operation of the electronic system 102 coupled to the display electronics, and present the image 120 as a wide-angle image, as described in greater detail below. In various embodiments, the display electronics 104 may be adapted or configured to support operation of a plurality of electronic systems 102 and/or head-mountable devices 105 (for example, to provide a common image 120 to two or more users, e.g., a pilot and co-pilot).

Figure 2:
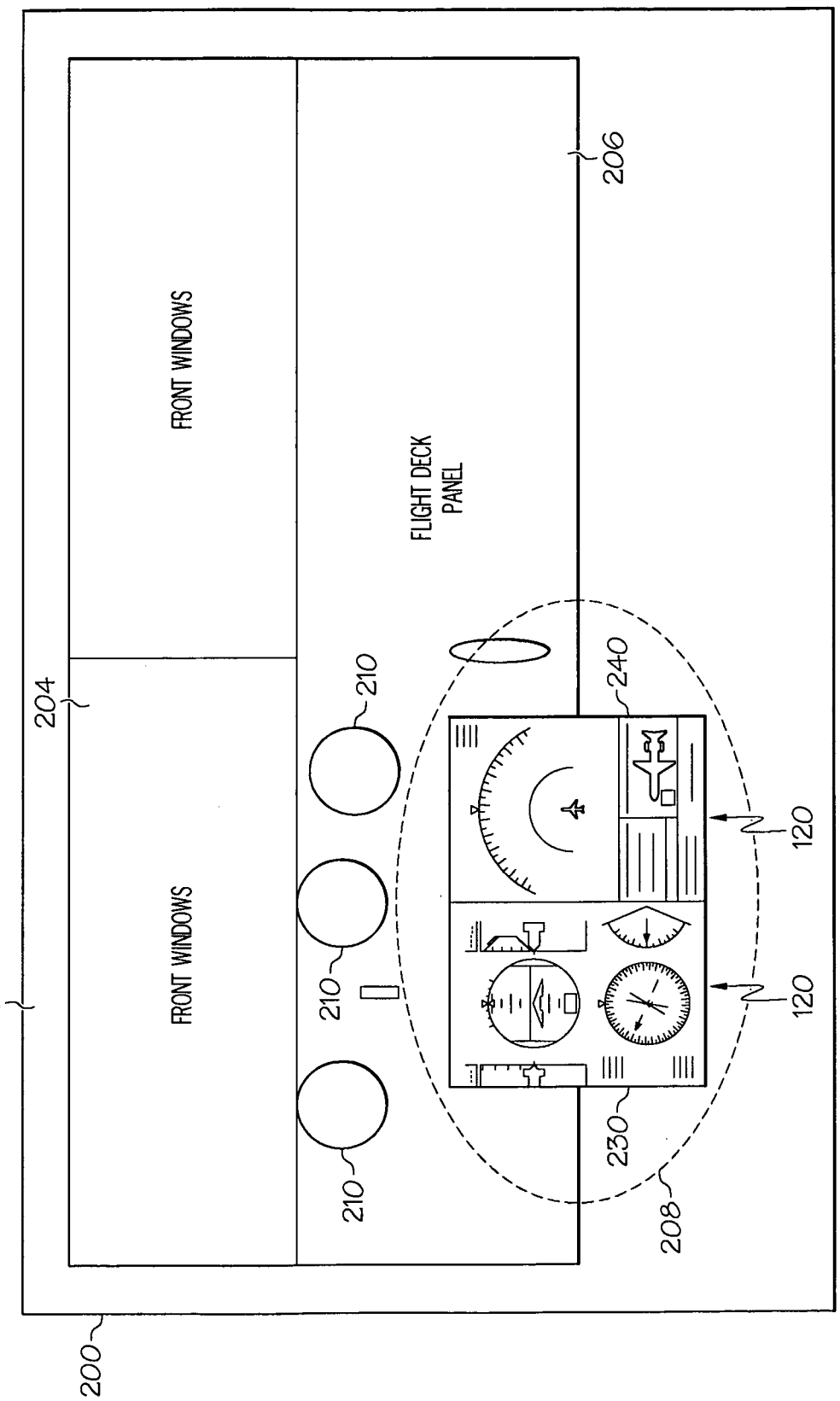
FIG. 2 is a diagram of an exemplary field of view in a head-mountable device suitable for use in the cockpit display system of FIG. 1.

Referring now to FIG. 1 and FIG. 2, in an exemplary embodiment, the support structure 106 is adapted to be worn on the head of a user. In accordance with one embodiment, the support structure is realized as an eyeglass frame. In alternative embodiments, the support structure 106 may be realized as a helmet, goggles, mask, visor, or the like, and may include straps or other elements to provide support and/or comfort to a user. In an exemplary embodiment, the support structure 106 has a perimeter 200 defining a field of view 202. In an exemplary embodiment, the field of view 202 is aligned with the eyes of the user (e.g., the user's line of sight) when the support structure 106 is worn on the user's head. The field of view 202 may be substantially transparent to allow a user to view the surrounding environment. For example, in the context of an aircraft cockpit, a pilot or crew member may be able to see through the field of view 202 to view out the front windows 204 or at the flight deck panel 206. In the aviation context, the flight deck panel 206 may include standby instruments 210 and other controls (e.g., knobs, switches, buttons) to allow the pilot or crew to interact and/or influence an associated avionics system, as will be understood. In an exemplary embodiment, a lower or bottom portion 208 of the field of view 202 is obstructed and/or occupied by display element 108, as described below.

In accordance with one embodiment, the support structure 106 may be configured to support and/or house a lens aligned with the field of view 202. Depending on the needs of a user wearing the support structure 106, the lens may be a prescription lens. The support structure 106 may be configured such that the lenses are replaceable and/or mountable, to allow various user's with different needs utilize the same head-mountable device 105. The support structure 106 may also be capable of housing sunglass lenses or clip-on lenses.

Still referring to FIG. 1 and FIG. 2, in an exemplary embodiment, the display element 108 is mechanically coupled to and/or supported by the support structure 106, such that the display element 108 is aligned with, occupies, and/or obstructs a lower or bottom portion 208 of the field of view 202. The display element 108 is communicatively coupled to and primarily controlled by the display electronics 104. In this regard, the display element 108 may communicate with the display electronics 104 via a physical or wired interface (e.g., a data bus or cable) or wirelessly (e.g., using IEEE 802.11, Bluetooth, infrared). In an exemplary embodiment, the display element 108 has displayed thereon a graphical representation or image 120 of an instrument panel associated with an electronic system 102 coupled to the display electronics 104. For example, in an aviation context, the image 120 may comprise one or more graphical representations of one or more cockpit instrument panels, such as a map or navigation display, a primary flight display (PFD), a flight management system (FMS), and the like. In an exemplary embodiment, the display element 108 is realized as an organic light-emitting diode (OLED) display. In alternative embodiments, the display element 108 may be realized as a liquid crystal display (LCD), a liquid crystal on silicon (LCOS) display, a digital micromirror display, or another suitable display technology.

In some embodiments, the head-mountable device 105 may include more than one display element 108. For example, there may be two display elements 230, 240 located adjacent to (e.g., side by side as perceived by a user) one another in the bottom portion 208 of the field of view 202. In such an embodiment, each display element may convey a different image, for example, a first display element 230 may display an image of a first instrument panel (e.g., primary flight display) associated with a first electronic system and a second display element 240 may display a second instrument panel (e.g., a navigational display or map) associated with a second electronic system. In various embodiments, the display elements 230, 240 may be coupled to and driven by a respective instance of display electronics 104 or the same display electronics 104. Accordingly, in practice, the head-mountable device 105 may include a plurality of display elements 108 (e.g. display elements 230, 240), and each respective display element 108 may have a respective image 120 that may be identical to or different from the image 120 on another display element 108. However, although the following discussion may refer to display element 108 or image 120 in singular form for purposes of clarity and ease of description, the subject matter described herein should be understood to apply equally to systems utilizing a plurality of display elements 108 and/or images 120 unless expressly stated otherwise.

Referring again to FIG. 1, in an exemplary embodiment, optics 114 may be mechanically coupled to and/or supported by the support structure 106 such that the optics 114 are substantially aligned with the display element 108. In some embodiments, the optics 114 may be realized as one or more suitable optical devices, such as lenses, glasses, prisms, mirrors, and various combinations thereof. In accordance with one embodiment, the optics 114 are integral with the display element 108. In an exemplary embodiment, optics 114 are configured to be able to provide an opaque image. Unlike conventional head-up display systems, the optics 114 are not required to be transparent, which allows for a more simplified design of the optics 114. Depending on the embodiment, the optics 114 may be configured or controlled to adjust the appearance of the image 120 to the user. For example, a control element 112 may be coupled to the optics 114 to allow a user to adjust the focus of the image 120. In an exemplary embodiment, the optics 114 and display element 108 are cooperatively configured to convey the image 120 as a wide-angle image. The wide-angle image allows the cockpit display system 100 to adequately view most or all electronic instrument displays normally located on the flight deck panel 206 in conventional glass cockpits. Further, the wide angle view also provides for a better utilization of the field of view and unlike in a traditional cockpit panel, multiple displays do not have to be separated by bezels or other divider mechanisms which detract form the available space for an image.

Referring now to FIG. 3, with continued reference to FIG. 1 and FIG. 2, in an exemplary embodiment, the display element 108 and/or the optics 114 are configured such that the image 120 appears to be a distance from a user and at a downward angle relative to the user's forward line of sight. In an exemplary embodiment, the image 120 is positioned in angle and size such that it does not interfere when viewing straight ahead (e.g., out of front windows 204) or down into the cockpit (e.g., at flight deck panel 206). In accordance with one embodiment, the image 120 appears to be approximately 18 inches away from the user and at a downward angle. In a preferred embodiment, the image 120 appears (e.g., oriented or centered) at a downward angle between approximately 30° to 60° relative to the user's forward line of sight. In practice, the downward angle may vary depending on the needs of a user or characteristics of the cockpit. For example, the orientation of the windows and/or flight deck panel in a given cockpit may dictate a downward angle of the image 120 that provides a more functional view. In the exemplary embodiment shown in FIG. 1, the image 120 appears at a downward angle of approximately 45°. In an exemplary embodiment, the image 120 is a wide-angle image. For example, in one embodiment, the image 120 appears to be approximately 18 inches wide and 8 inches tall. In other embodiments, the dimensions of the image 120 may vary depending on the needs of a user or characteristics of the cockpit. In accordance with one or more embodiments, the optics 114, display element 108, and/or display electronics 104 are capable of varying the opaqueness of the image 120 to allow a user to view through the image 120, as described below. In an exemplary embodiment, the image 120 is substantially opaque.

As shown, in an aviation environment, the cockpit display system 100 described herein enables a user to view through the top portion of the field of view 202, to enable vision through the front windows 204 of the aircraft, at the flight deck panel 206, and throughout the aircraft at the surrounding environment, as will be understood. In this regard, the head-mountable device 105 operates similarly to conventional bifocals, as will be understood. By a simple movement or glance of the eyes downward, the user can view instrument panels displayed on the image 120, in the same manner as a user would glance to view a conventional panel-mounted electronic cockpit display. For example, one or more display elements 108 may be configured to display various cockpit instrument panels, such as a map or navigation display, a primary flight display (PFD), a flight management system (FMS), and the like. Accordingly, the image 120 may effectively simulate a traditional cockpit display (e.g., glass cockpit), and thereby allow electronic display capability to be added to and/or implemented in an aircraft while requiring limited, if any, additional cockpit space. Additionally, the traditional electronic displays associated with the cockpit instrument panels may be removed from the flight deck panel 206 to create additional space in the cockpit. Backup or standby instruments 210 and/or controls may remain in the flight deck panel 206, as will be appreciated in the art.

It should be noted that the image 120 does not track head movements, nor is the image 120 overlaid upon a real world environment. Additionally, by virtue of a wide-angle view and optics 114, the image 120 may be robust and provide additional information than the minimal information available in conventional head-up display systems, which are often limited to basic flight data (e.g., airspeed, altitude). A conventional head-up display may still be utilized concurrently, for example, by projecting or overlaying data on the front windows 204 or elsewhere in the cockpit, as will be understood. Alternatively, the head-mountable device 105 may be modified to incorporate a head-up display aligned with the top or upper portion of the field of view 202 not occupied and/or obstructed by the display element 108, for example, by projecting an image onto a lens or other element incorporated into the head-mountable device 105.

Referring again to FIG. 1, and with continued reference to FIG. 2 and FIG. 3, in an exemplary embodiment, a sensor system 110 may be coupled to the display electronics 104 and/or the display element 108, and includes one or more sensors to obtain feedback information regarding the operation of the cockpit display system 100 or provide additional features and functionality. Depending on the embodiment, the sensor system 110 may be configured to provide a sensed signal to the display electronics 104 for processing, or alternatively, the sensor system 110 may include intelligence and/or provide functionality independently, as described in greater detail below. In an exemplary embodiment, the sensor system 110 is mechanically coupled to and/or supported by the support structure 106.

In accordance with one embodiment, the sensor system 110 includes a sensor integral to the support structure 106, and cooperatively configured with the display electronics 104 and/or display element 108 to temporarily cause the image 120 to become substantially transparent (or blank) in response to detecting an angle of the support structure 106 that exceeds a threshold value relative to a reference plane. In accordance with one embodiment, the reference plane is a horizontal plane aligned with eyes of a user in a neutral position and parallel to the horizontal axis of a vehicle (e.g., the straight-ahead line of sight for the user). For example, if the angle of the support structure 106 (e.g., when the user looks downward) exceeds a threshold value, the display electronics 104 and/or sensor system 110 is configured to temporarily cause the image 120 to become substantially transparent and/or disable the display element 108. In an exemplary embodiment, the threshold value is chosen as an angle that is greater than an angle associated with normal operation, such that an angle greater than the threshold value indicates a desire on behalf of the user to view something that may be obstructed and/or obscured when an image 120 is displayed (e.g., to look down at foot pedals or the floor). In accordance with one embodiment, the sensor system 110 may be cooperatively configured with the display electronics 104 and/or display element 108 to temporarily cause the image 120 to become substantially transparent in response to detecting a rate of change (or acceleration) of the angle of the support structure 106 relative to a reference plane which exceeds a threshold rate of change.

In another embodiment, the sensor system 110 includes a sensor configured to obtain a signal indicative of the image 120. In an exemplary embodiment, the sensor is configured to monitor and/or extract at least a portion of the image 120 and provide feedback to the display electronics 104 as a means of verifying that the display element 108 is working properly and does not pose a hazard by providing improper information. For example, the sensor system 110 may include a small camera, or the like, mechanically coupled to and/or supported by the support structure 106 and configured to obtain feedback regarding the image 120 on the display element 108. The sensor system 110 may provide this feedback data or signal to the display electronics 104, which may be configured to analyze the signal to determine if the cockpit display system 100 is operating properly (e.g., the image 120 corresponds to what the display electronics 104 intended to display). For example, the display electronics 104 may be configured to ensure that the image 120 accurately reflects the input to the display electronics 104 from the electronic system 102 or the output of the display electronics 104.

In an exemplary embodiment, one or more control elements 112 are coupled to the display electronics 104 and/or the display element 108. The control element 112 may be realized as a button, a switch, a knob, or the like. The control element 112 may also be realized as a device or mechanism that is responsive to sound or oral commands (e.g., voiceactivated), gestures, or other user input methods that do not require direct physical and/or tangible interaction. For example, as shown in FIG. 3, the control element 112 (e.g., a button) may be worn by a user. In alternative embodiments, the control element 112 may be located on the support structure 106, on a yoke, or another convenient location. In some embodiments, the control element 112 may be integrated in the flight deck panel 206. The control element 112 may be configured to interface with the user to provide additional functionality to the cockpit display system 100. For example, controls that may be traditionally associated with the electronic system 102 (e.g., part of the flight deck panel 206 in the aviation context), may be incorporated into the cockpit display system as control element 112, which may further reduce space and/or size constraints imposed by the system.

In an exemplary embodiment, a control element 112 is realized as a button or switch, wherein the display electronics 104 are configured to temporarily cause the image 120 to become substantially transparent (or blank) in response to the control element 112 being activated. For example, if the user wants to temporarily disable the display element 108 and/or image 120, the user may manually activate (e.g., press) the control element 112. The display electronics 104 may cause the image 120 to become substantially transparent or blank in response to a user activating the control element 112. In one embodiment, the display electronics 104 are configured to cause the image 120 to be substantially transparent and/or blank when the control element 112 is activated, and resume normal display of the image 120 when the control element 112 is activated a second time. In alternative embodiments, the display electronics 104 may be configured to cause the image 120 to be substantially transparent only while the control element 112 is activated (e.g., while a button is depressed) or for a fixed period of time after activating the control element 112. The control element 112 and display electronics 104 may be modified to blank or make substantially transparent only a portion of the image 120, while normally displaying the remainder of the image 120. For example, the control element 112 may be adapted to allow the user to blank a portion of the image 120 (e.g., the right or left half).

In alternative embodiments, a control element 112 may be provided and configured to control or adjust display characteristics of the image 120, such as brightness, contrast, display option, and the like. Another control element 112 may be provided to adjust the focus of the image 120 and/or display element 108 as needed. For example, the control element 112 may be configured to control a small motor and linkage mechanically coupled to the support structure 106 and/or optics 114 to adjust the focus as desired. In another embodiment, a control element 112 is provided to adjust the image 120 to the left or to the right, to provide more viewing to one side or the other. For example, if a pilot wearing the head-mountable device 105 is seated in the left-hand seat with a throttle in the center (e.g., to the pilot's right), the pilot may adjust the image 120 more to the left to allow better viewing of the throttle (e.g., to the right).

It should be appreciated that in various embodiments, the cockpit display system 100 may be modified to suit various needs or concerns. In most aviation environments, there are additional safety concerns and a need for redundancy that often is not present in other environments. For example, the cockpit display system 100 may be adapted to accommodate a plurality of head-mountable devices 105. For example, the display electronics 104 may be adapted to drive several sets of head-mountable devices 105 and/or display elements 108. This allows a user to substitute or utilize a spare (or backup) head-mountable device 105 in the event a first head-mountable device 105 fails. Multiple users (e.g., a pilot and a co-pilot, an observer, or other aircrew members) may each have a respective head-mountable device 105 having an identical display on each respective device.

In accordance with one embodiment, additional redundancy approaches may be added to ensure safe and reliable operation in flight. For example, assuming there are two crew members (e.g., pilot and co-pilot), each crew member's head-mountable device 105 can be driven by separate display electronics 104, as a safeguard against failure of one of the display electronics 104. In another embodiment, each display element 108 in a head-mountable device 105 can be driven and/or controlled by separate display electronics 104. Display elements 108 may also be overlaid (e.g., one on top of the other), such that with the proper synchronization of images which overlay each other (or contribute a portion of the image), a failure of a single display electronics 104 and/or display element 108 may not have an adverse effect during critical portions of flight.

One advantage of the system described above is that the cockpit display system simulates the view of an aircraft glass cockpit (e.g., an aircraft flight deck panel with multiple large electronic instrument panel displays) in a spatially efficient manner. The system uses a head-mountable device with a wide-angle view using imaging (or optics) and positioned in a downward way so that it does not interfere with forward view. The system does not require flight-deck panel space for a display, and is relatively easy to install, modify, and retrofit. Additionally, safety features and levels of redundancy necessary for aviation standards or operation may also be implemented. Accordingly, the head-mountable cockpit display system described herein may be utilized to replace all glass cockpit displays, not just those that provide flight data.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A display system comprising: a support structure, the support structure being adapted to be worn on a head of a user during operation of an aircraft, the support structure having a perimeter defining a field of view aligned with the eyes of the user, wherein the field of view is substantially transparent: a display element coupled to the support structure, wherein the display element occupies a bottom portion of the field of view and does not occupy an upper portion of the field of view; a processor coupled to the display element; an electronic system coupled to the processor, wherein the processor is configured to display a graphical representation of an instrument panel associated with the electronic system on the display element at a downward angle relative to a forward line of sight of the user, the instrument panel providing graphical information indicative of one or more characteristics of the electronic system during the operation of the aircraft; and a sensor coupled to the processor and configured to obtain a signal indicative of the graphical representation, wherein the processor is configured to analyze the signal to determine if the display system is operating properly.

2. A head-mountable device suitable for wearing during operation of an aircraft, the head-mountable device comprising: an eyeglass frame adapted to be worn on the head of a user, the eyeglass frame defining a field of view aligned with the eyes of the user, wherein the field of view is substantially transparent; a display element supported by the eyeglass frame, wherein the display element obstructs a lower portion of the field of view and an upper portion of the field of view is not obstructed by the display element; a display controller coupled to the display element, the display controller being configured to: control rendering of an image on the display element, wherein the image contains graphical information associated with operation of the aircraft; and present the image rendered on the display element as a wide-angle image at a downward angle relative to a forward line of sight of the user; and a sensor coupled to the processor and supported by the eyeglass frame, the sensor being configured to obtain a signal indicative of the image, wherein the processor is configured to verify the image accurately reflects information associated with a subsystem of the aircraft.

* * * * *